(12) United States Patent
Tsubaki (10) Patent No.: US 8,528,098 B2
(45) Date of Patent: Sep. 3, 2013

(54) ELECTRONIC FILE BROWSING SYSTEM AND CONTROL METHOD THEREOF

(75) Inventor: Hisayoshi Tsubaki, Kanagawa (JP)

(73) Assignee: Fujifilm Corporation, Tokyo (JP)

( * ) Notice: Subject to any disclaimer, the term of this patent is extended or adjusted under 35 U.S.C. 154(b) by 323 days.

(21) Appl. No.: 12/892,704

(22) Filed: Sep. 28, 2010

(65) Prior Publication Data

US 2011/0078769 A1    Mar. 31, 2011

(30) Foreign Application Priority Data

Sep. 29, 2009  (JP) ................................. 2009-224904

(51) Int. Cl.
*H04L 29/06* (2006.01)

(52) U.S. Cl.
USPC .................. 726/26; 713/165; 726/28; 726/29

(58) Field of Classification Search
USPC ......................................................... 726/26
See application file for complete search history.

(56) References Cited

U.S. PATENT DOCUMENTS

| | | | |
|---|---|---|---|
| 7,017,188 B1 * | 3/2006 | Schmeidler et al. ............ | 726/26 |
| 7,096,203 B2 * | 8/2006 | Pence et al. ...................... | 705/59 |
| 7,752,202 B2 | 7/2010 | Kobori et al. | |

FOREIGN PATENT DOCUMENTS

| | | |
|---|---|---|
| JP | 2004-046789 A | 2/2004 |
| JP | 2007-199983 A | 8/2007 |
| WO | WO 2005/015422 A1 | 2/2005 |

OTHER PUBLICATIONS

Japanese Office Action dated Feb. 20, 2013 with an English translation.
Kazuo Ishida, "Image-based Document Viewer of Mail Attachments on Mobile Phone", vol. 30 No. 27 ITE Technical Report, Japan, The Institute of Image Information and Television Engineers, Jul. 18, 2006, vol. 30, pp. 39 to 42.

* cited by examiner

*Primary Examiner* — Taghi Arani
*Assistant Examiner* — Mohammad L Rahman
(74) *Attorney, Agent, or Firm* — McGinn IP Law Group, PLLC (57) ABSTRACT

An electronic file browsing system includes an electronic file delivery device and a file processing server. When document file browsing is requested from a mobile phone, a mobile phone access server in the file delivery device creates link information including session ID as authentication information and sends it to the mobile phone. Based on this link information, the mobile phone accesses the file processing server. The file processing server obtains session ID from the mobile phone and adds this session ID to the delivery request of the document file to the mobile phone access server.

8 Claims, 9 Drawing Sheets

[BEFORE REWRITING] — 43

<a href="https://path-to-document">sample.doc</a>

- https://path-to-document : URL OF ELECTRONIC FILE
- sample.doc : FILE NAME OF ELECTRONIC FILE

FIG. 3B

[AFTER REWRITING] — 44

<a href="https://docx-hostname/link?  ... target=https://fuji1-hostname/file-name;jsessionid=xxxx& ... returnurl=https://fuji1-hostname/ServiceMenu.do;jsessionid=xxxx" > ... sample.doc</a>

- https://docx-hostname/link : URL OF FILE PROCESSING SERVER
- https://fuji1-hostname/file-name : URL OF DOCUMENT FILE
- jsessionid=xxxx (first) : SESSION ID
- https://fuji1-hostname/ServiceMenu.do : RETURN URL
- jsessionid=xxxx (second) : SESSION ID
- sample.doc : FILE NAME OF DOCUMENT FILE

ELECTRONIC FILE BROWSING SYSTEM AND CONTROL METHOD THEREOF

BACKGROUND OF THE INVENTION

1. Field of the Invention

The present invention relates to an electronic file browsing system in which an electronic file is browsed with a mobile terminal.

2. Description of the Related Art

There is known a browsing system in which company information such as e-mails and schedules stored in a server of a company is converted to data for mobile terminals, like mobile phones, and delivered thereto so that such company information is browsed with the mobile phones outside of the company. Such browsing system is desired to enable browsing of electronic files attached to e-mails or stored in the server. However, the electronic files (hereinafter, referred to as document files) created by word-processing software, spreadsheet software, presentation software, and the like for personal computer terminals cannot be browsed with the mobile phones if the document files are delivered to the mobile phones without any conversion, because the corresponding software is not installed on the mobile phones in many cases.

In Japanese Patent Laid-Open Publication No. 2007-199983, when document files such as described above are requested to deliver, the document files are converted to image data and delivered. Owing to this, there is no need to prepare software corresponding to the document files, and contents of the document files can be browsed with mobile phones by just providing an image data viewer.

Types of image data (format such as JPEG and bitmap, resolution, image size, and the like) which can be displayed with mobile phones differ according to the model. Therefore, when document files are delivered after being converted to image data, the document files should be converted to the format corresponding to the model of the mobile phone.

Since new models of mobile phones are released one after another, the conversion function for converting document file to image data, if it is provided in the company server like the JP-A 2007-199983, needs maintenance such as registry of data for new model every time a new model is released, which takes time.

As a solution for this problem, it may be possible to make Application Service Provider (ASP) do the image conversion processing. For example, when a user requests delivery of document file, the document file is once transferred to the ASP and converted to image data by the ASP. Then, the user accesses the ASP to browse the image data of the document file with a mobile phone. This way, the maintenance of the conversion function is delegated to the ASP, so that the maintenance of the company server becomes unnecessary.

However, when the image data is browsed by the user according to the process described above, there is a possibility that unauthorized users access the ASP, which may cause information leakage. To prevent this, it is possible to perform user authentication when accessing the ASP as well. According to this method, however, the user needs to input ID or password in both time when accessing the server in the company and the server in the ASP, which makes operation troublesome.

SUMMARY OF THE INVENTION

In view of the foregoing problems, it is an object of the present invention to maintain security of a browsing system without making an operation of a user complicated when conversion processing from a document file to image data is delegated to the ASP.

In order to achieve the above and other objects and advantages of this invention, an electronic file browsing system of the present invention includes an electronic file delivery device which is provided in a small network constructed in a predetermined area and accessible from a mobile terminal via a public network and a file processing device which can be connected to the electronic file delivery device and the mobile terminal via the public network. The electronic file delivery device stores a plurality of electronic files and delivers a requested electronic file.

The electronic file delivery device has a user authentication section, an authentication information creation section, a link information creation section, and a link information delivery control section. The user authentication section performs user authentication by judging whether a user of the mobile terminal is a proper user or not when delivery of the electronic file is requested from the mobile terminal. The authentication information creation section creates authentication information indicating an authorized user when the user of the mobile terminal is judged as the proper user. The link information creation section creates link information composed of information for accessing the file processing device, file location information indicating location of the requested electronic file, and the authentication information. The link information delivery control section delivers the link information to the mobile terminal which made request.

The file processing device has a file acquisition control section, a conversion section, and a control section. When the mobile terminal accesses the file processing device based on the link information, the file acquisition control section extracts the file location information and the authentication information included in the link information and requests the electronic file delivery device for delivery of the requested electronic file based on each of the extracted information, and acquires the electronic file from the electronic file delivery device. The conversion section converts the acquired electronic file to image data. The control section delivers the electronic file as the image data to the mobile terminal.

It is preferable that the electronic file delivery device further includes a judgment section and a file delivery control section. When delivery of electronic file is requested from the file acquisition control section, the judgment section acquires the authentication information from the file processing device to judge whether the acquired authentication information matches the authentication information created by the authentication information creation section, and thereby confirming whether the delivery request from the file acquisition control section is made from a proper user or not. The file delivery control section delivers the requested electronic file to the file processing device when the judgment section judges that each of the authentication information matches, while denying delivery of the requested electronic file when the judgment section judges that each of the authentication information does not match.

The link information creation section preferably adds return information to the link information. The return information designates return destination to return to the electronic file delivery device after the mobile terminal accesses the file processing device.

It is preferable that the file processing device includes a model determination section which specifies a model of the mobile terminal. At this time, the conversion section converts the electronic file to the image data according to the model specified by the model determination section.

When the mobile terminal accesses, the file processing device preferably creates screen data of a viewer start screen including a viewer start link to instruct starting of a viewer to display the image data. At this time, the file acquisition control section starts acquisition of electronic file while delivering the screen data.

It is preferable the mobile terminal sends model information indicating its model in response to a click of the viewer start link. At this time, the model determination section specifies the model of the mobile terminal based on the model information from the mobile terminal.

It is preferable that the electronic file delivery device includes an operation history record section which records an operation history of the user. At this time, the file processing device includes a record instruction section which instructs the operation history record section to record the operation history.

It is preferable that the electronic file browsing system further includes an unauthorized access prevention device between the small network and the public network. The unauthorized access prevention device prevents unauthorized access to the small network.

A control method of electronic file browsing system of the present invention includes a user authentication step, an authentication information creation step, a link information creation step, a link information delivery step, an information extraction step, an electronic file acquisition step, a data conversion step, and a delivery step. In the user authentication step, user authentication is performed by judging whether a user of the mobile terminal is a proper user or not when the mobile terminal accesses the electronic file delivery device. In the authentication information creation step, authentication information indicating an authorized user is created when the user of the mobile terminal is judged as the proper user. In the link information creation step, link information composed of information for accessing the file processing device, file location information indicating location of the requested electronic file, and the authentication information is created when delivery of the electronic file is requested from the mobile terminal to the electronic file delivery device. In the link information delivery step, the link information is delivered to the mobile terminal which made request. In the information extraction step, the file location information and the authentication information included in the link information are extracted when the mobile terminal accesses the file processing device based on the link information. In the electronic file acquisition step, the electronic file is acquired from the electronic file delivery device by requesting the electronic file delivery device to deliver the requested electronic file based on each of the extracted information. In the data conversion step, the acquired electronic file is converted to image data. In the delivery step, the electronic file as the image data is delivered to the mobile terminal to be displayed on a display section of the mobile terminal.

It is preferable that the control method of electronic file browsing system further includes a judgment step and a delivery control step. In the judgment step, the authentication information is acquired from the file processing device when delivery of electronic file is requested from the file processing device, and it is judged whether the acquired authentication information matches the authentication information created in the authentication information creation step, and thereby confirming whether the delivery request from the file processing device is made from a proper user or not. In the delivery control step, the requested electronic file is delivered to the file processing device when it is judged that each of the authentication information matches, while denying delivery of the electronic file when it is judged that each of the authentication information does not match.

According to the present invention, since it can be confirmed if the delivery request from the file processing device is made by a proper user by judging whether the authentication information obtained from the file processing device and the authentication information created by the electronic file delivery device matches, security of the electronic file browsing system can be maintained even if an external sever provided by the ASP and the like works as the file processing device. In addition, since it is not required to input ID or password when obtaining electronic file form the file processing device, the electronic file can be retrieved with ease.

BRIEF DESCRIPTION OF THE DRAWINGS

The above objects and advantages of the present invention will become more apparent from the following detailed description when read in connection with the accompanying drawings, in which.

DESCRIPTION OF THE PREFERRED EMBODIMENTS

Figure 1:
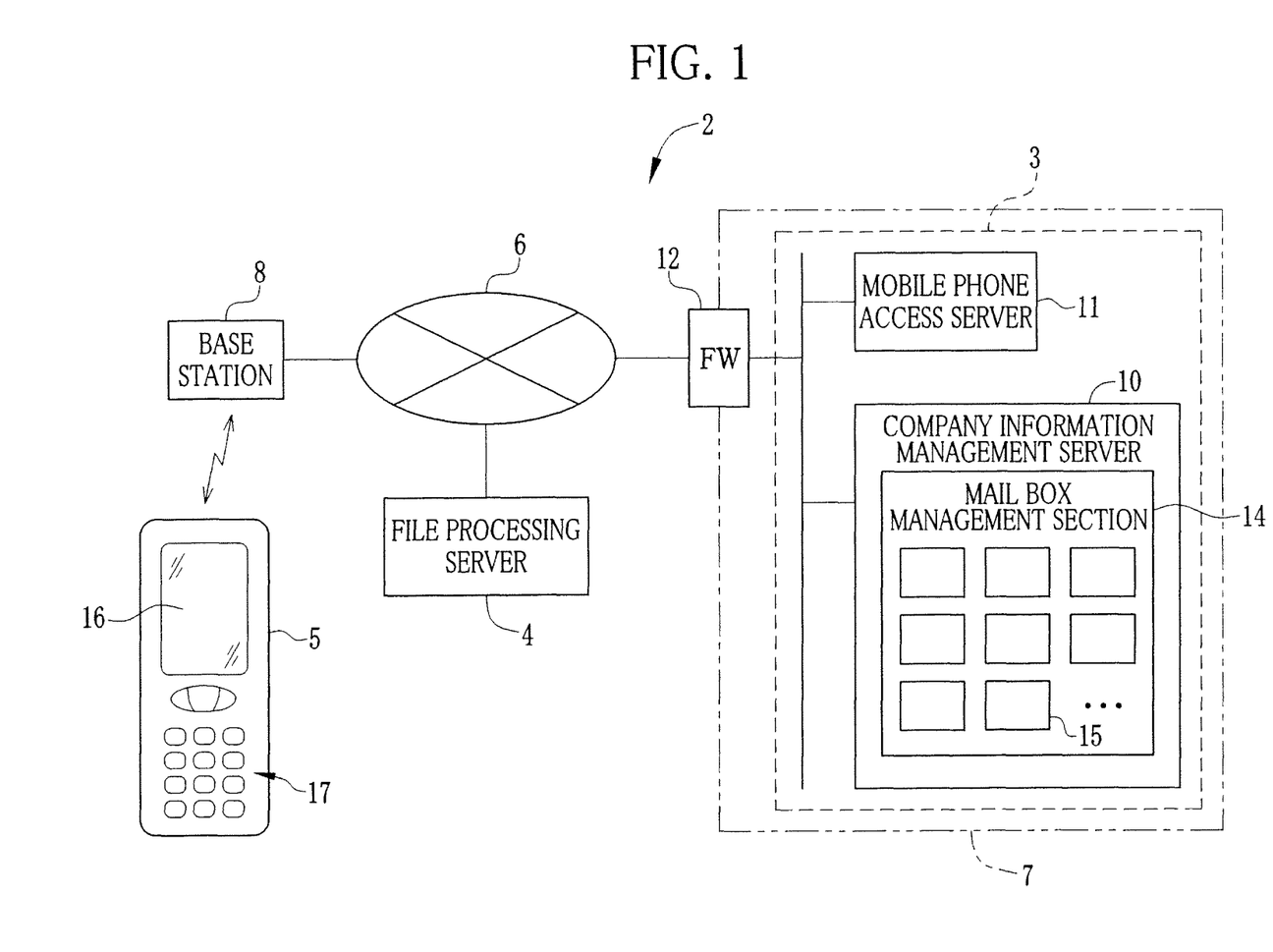
FIG. 1 is an explanatory view illustrating a composition of a company information browsing system.

As shown in FIG. 1, a company information browsing system (in-house information browsing system) 2 is constructed of a company information delivery device 3 and a file processing server 4. The company information delivery device 3, the file processing server 4 and a mobile terminal such as, for example, a mobile phone 5 are capable of communicating with one another via an internet 6 which is a public network. Here, the company information delivery device 3 corresponds to the electronic file delivery device, and the file processing server 4 corresponds to the file processing device.

The company information delivery device 3 is provided in a network of a company LAN 7 which is constructed in a business office of a company. The company information delivery device 3 stores various company information created inside of the company, and delivers the company information according to a request from the mobile phone 5. That is, the company information browsing system 2 enables browsing of various company information such as e-mails and schedules from outside of the company by delivering the company information from the company information delivery device 3 to the mobile phone 5.

The company information delivery device 3 is constructed of a company information management server 10 and a mobile phone access server 11. The company information management server 10 is a server providing a so-called groupware which manages overall company information and supports improvement of work efficiency inside the company and company information-sharing. The company information management server 10 has, for example, a schedule management function for managing a schedule of each user (employee), an e-mail sending/receiving function and an electronic bulletin board function enabling each user to post or browse various information.

A firewall (means for preventing unauthorized access, and hereinafter, abbreviated to as FW) 12 is provided between the company LAN 7 and the internet 6. The FW 12 refers to, for example, a source IP address included in a packet being sent and judges whether the source of the packet is the mobile phone 5 or not. When the source is judged as the mobile phone 5, the FW 12 refers to a designated IP address of the packet and judges whether the designation is the mobile phone access server 11 or not. The FW 12 allows the packet to pass through when the designation is the mobile phone access server 11, and does not allow the packet to pass through when the designation is not the mobile phone access server 11.

That is, the mobile phone access server 11 is a dedicated public server for the mobile phone 5. The mobile phone access server 11 judges whether a user of the accessed mobile phone 5 is a proper user or not. When the user is the proper user, the mobile phone access server 11 reads out the company information according to a request of the mobile phone 5 from the company information management server 10, and delivers this company information to the requested mobile phone 5 after conversion into data corresponding to the mobile phone 5.

In this way, the mobile phone access server 11 and the FW inhibit the mobile phone 5 from accessing the company information management server 10 directly. Owing to this, security risks such as tampering or improper readout of data stored in the company information management server 10 or entry of virus into the company information management server 10 can be prevented.

The company information management server 10 is provided with a mail box management section 14. The mail box management section 14 has mail boxes 15 of the users. Each mail box 15 stores data of received mails, sent mails and files attached to these mails of the relevant user. The user inside of the company can send or receive mails, browse received mails and files attached to the mails by accessing the company information management server 10 from a PC terminal (not shown) for business use which is provided to each employee via the company LAN 7.

The file processing server 4 converts document files which are electronic files created by word-processing software, spreadsheet software, presentation software, and the like for personal computer terminals and cannot be browsed with the mobile phone 5 into image data. The converted image data can be browsed with the mobile phone 5.

In the company information browsing system 2, when the user requests the company information delivery device 3 to deliver a document file, the requested document file is transferred to the file processing server 4 and converted to the image data therein. Then, link information for accessing the file processing server 4 is sent from the company information delivery device 3 to the mobile phone 5. The image data of the requested document file is browsed with the mobile phone 5 by making the user access the file processing server 4. Owing to this, the user can check the contents of the document file through the image data.

The file processing server 4 is provided by the ASP which is different from the company that owns the company information delivery device 3. Therefore, the file processing server 4 is provided outside of the company LAN 7.

If the file processing server 4 is provided in the company, for example, maintenance such as registry of data for new model of the mobile phone 5 needs to be done by an administrator of the company every time a new model is released, and this is extremely troublesome. Besides large companies which have an expert administrator, such maintenance work is a big burden for the administrator, who is mostly one of the employees, of the small and medium sized companies.

In contrast, if the file processing server 4 is provided outside of the company as described above, the maintenance work is delegated to the ASP, and therefore the administrator does not have to do such maintenance work.

As well known, the mobile phone 5 communicates wirelessly with a base station 8. The mobile phone 5 accesses the company information delivery device 3 or the file processing server 4 by being connected to the internet 6 via the base station 8. The mobile phone 5 is provided with a liquid crystal display (LCD) 16 to display various information thereon and an operation section 17 to input various operation instructions. The mobile phone 5 accesses the company information delivery device 3 or the file processing server 4 according to the instruction from the user which is input through the operation section 17, and displays the company information obtained from the company information delivery device 3 or the file processing sever 4 on the LCD 16.

Application software for a browser and a viewer is installed on the mobile phone 5. The browser is used when accessing the company information delivery device 3 or the file processing server 4, or when displaying the company information obtained from the company information delivery device 3. On the other hand, the viewer is used when displaying the image data obtained from the file processing server 4.

The viewer has functions to move to the next page, to the previous page, and jump to the specified page. When the document file converted to the image data in the file processing server 4 has more than one page, the viewer allows to switch the display of the page upon instruction to move to the next page, to the previous page, or to the specified page by operating the operation section 17. The view is also available to enlarge or reduce the displayed image or to perform clipping the same by operating the operation section 17.

Figure 2:
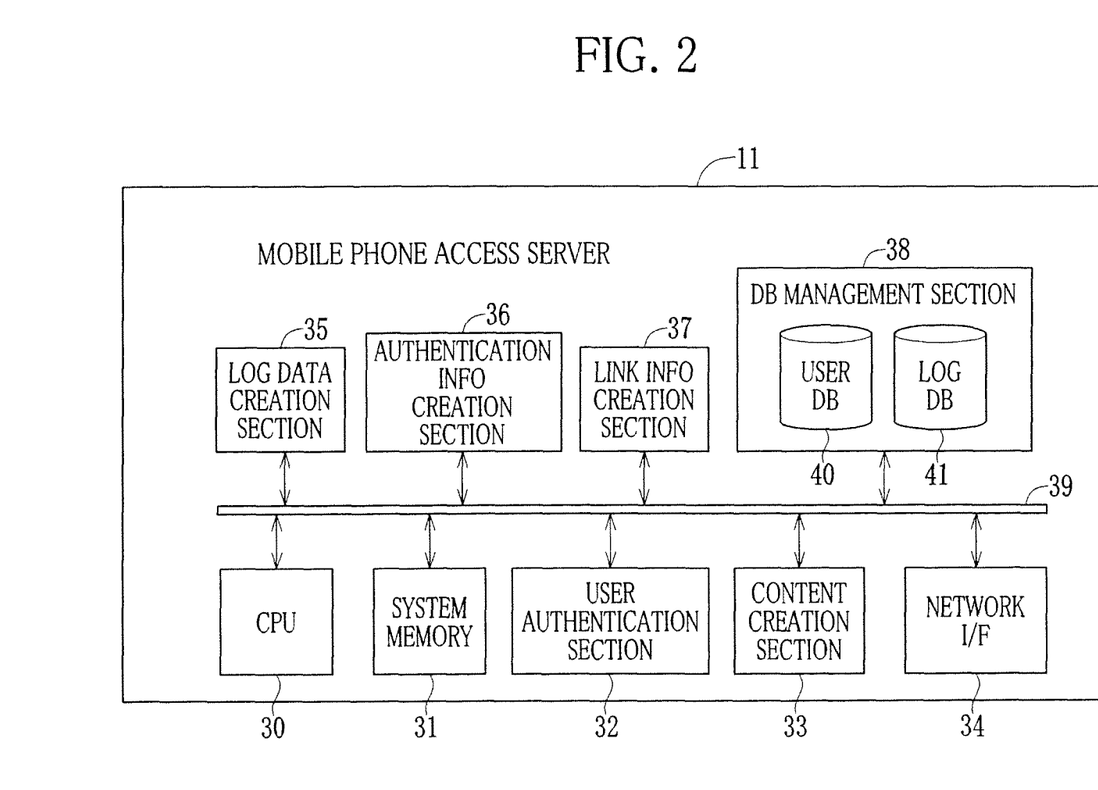
FIG. 2 is a block diagram illustrating a composition of a mobile phone access server.

As shown in FIG. 2, the mobile phone access server 11 includes a CPU (functions as link information delivery control section, judgment section, and file delivery control section) 30, a system memory 31, a user authentication section 32, a content creation section 33, a network interface (I/F) 34, a log data creation section 35, an authentication information creation section 36, a link information creation section 37, and a database (DB) management section 38. Each component is connected with one another via a bus 39.

The DB management section 38 is provided with a user DB 40 which stores user information of each user of the company information browsing system 2 and a log DB 41 which stores log data of each user. Thus, the DB management section 38 stores various data necessary for controlling the mobile phone access server 11 by complying a database.

The user information may be of, for example, user name, user ID and password related with one another, and used for identifying the user who accesses the mobile phone access server 11. In addition to the above items, the user information may include user's fingerprint information, iris information, and the like.

The log data is an operation history indicating time and date when the user accessed the mobile phone access server 11, name of the company information the user browsed, time and date when the user browsed this company information, and the like. The log DB 41 stores the log data in connection with the user ID. Owing to this, it is possible to know which user had what kind of access by referring to the log DB 41.

The system memory 31 is provided with a ROM area and a RAM area. In the ROM area, various programs and data for controlling the mobile phone access server 11 are stored. The RAM area temporarily stores various data created in the process of the control. The CPU 30 reads out the various programs from the system memory 31 and takes overall control of the mobile phone access server 11 by processing the programs one by one.

The user authentication section 32 performs user authentication to judge whether the user who accessed the mobile phone access server 11 is a proper user or not by matching the information input from the user and the user information stored in the user DB 40. When the user is judged as the proper user by the user authentication, the user is allowed to log in the mobile phone access server 11, and thereby the user can browse the electronic file of the company information.

The content creation section 33 creates HTML data corresponding to the browser of the mobile phone as contents delivered to the mobile phone 5 in response to the instruction from the CPU 30. When the company information such as e-mails and schedules is read out from the company information management server 10, for example, the content creation section 33 combines the company information with a preliminarily prepared template, and thereby creating the HTML data for the mobile phone 5. Owing to this, the company information created by the PC terminals can be displayed with the LCD 16 of the mobile phone 5.

The network I/F 34 is a known modem or rooter, and connects the mobile phone access server 11 to the company LAN 7 and the internet 6. The log data creation section 35 creates log data in response to the instruction from the CPU 30, and stores the log data in the log DB 41 in connection with the user ID of the user who is presently accessing.

The authentication information creation section 36 creates a session ID which is composed of arbitrary string of characters in response to the instruction from the CPU 30. The session ID is created as authentication information which indicates that the user is authorized. The authentication information creation section 36 stores the session ID in the log DB 41 in connection with the user ID of the user who is presently accessing.

When the session ID is created by the authentication information creation section 36, the mobile phone access server 11 sends a response to the mobile phone 5 with adding the session ID thereto. Next time the mobile phone 5 sends a request, the mobile phones adds the received session ID to the request. Owing to this, it is possible to identify whether the user is authorized or not by matching the session ID added to the request with the session ID stored in the system memory 31. The session ID stored in the system memory 31 is deleted after the elapse of a certain period of time or when the user logs off the mobile phone access server 11.

Figure 3A:
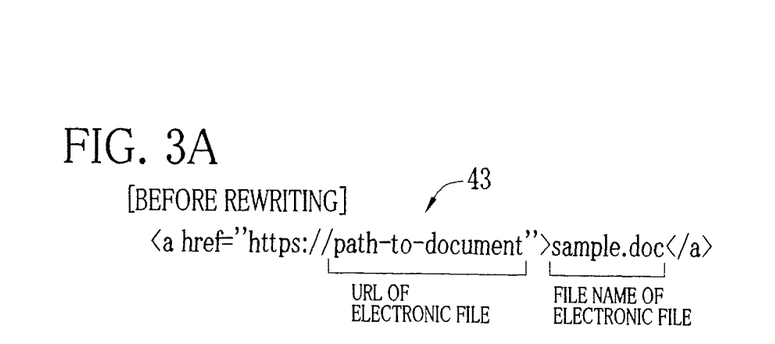
FIGS. 3A and 3B are explanatory views each illustrating a composition of link information.
Figure 3B:
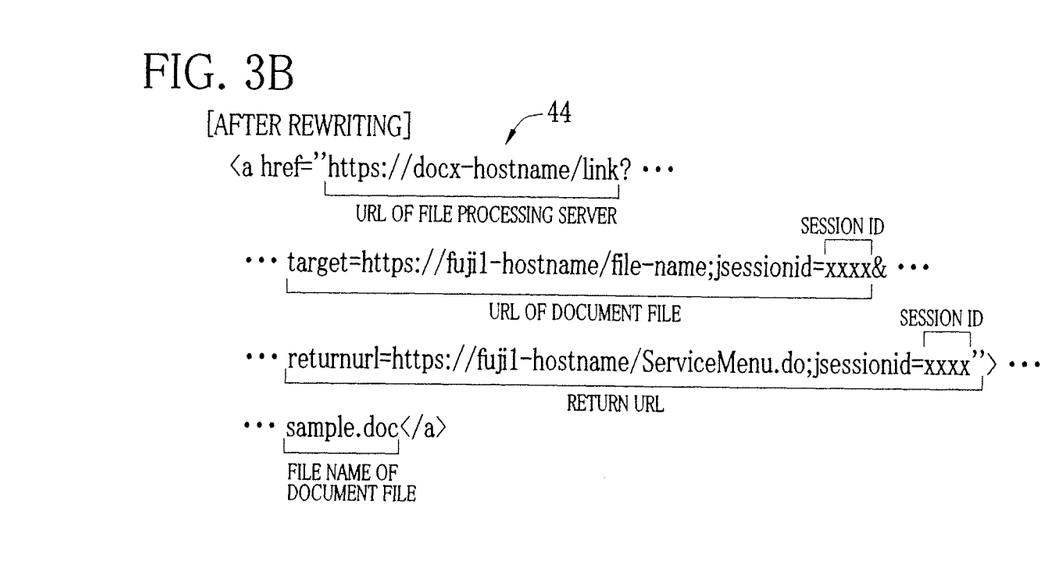

The link information creation section 37 creates link information 44 which makes the user access the file processing server 4 in response to the instruction from the CPU 30. The CPU 30 instructs the link information creation section 37 to create the link information 44 when the company information which the user requested the delivery includes a document file. As shown in FIGS. 3A and 3B, the link information creation section 37 creates the link information 44 by rewriting link information 43 which is for delivering a desired electronic file to the user who accessed the mobile phone access server 11.

The link information 43, as shown in FIG. 3A, is composed of a href tag, a URL of the electronic file which the user requested, and a file name of this electronic file (character information to display as a link). The link information 44, as shown in FIG. 3B, is composed of a href tag, a URL of the file processing server 4, a URL designating a return URL for returning from the file processing server 4 to the mobile phone access server 11, and a file name of a document file.

When the electronic file requested by the user is the document file, the link information creation section 37 obtains the URL of the file processing server 4 and the return URL, and rewrites the link information 43 to include these URLs, and thereby creating the link information 44. Note that the link information 44 is showed in 4 lines in FIG. 3B for the sake of convenience, however, the actual link information 44 is composed of a single line in which the parts shown with " . . . " are connected with each other.

In the link information 44, the session ID created by the authentication information creation section 36 is added to the URL of the document file and the return URL. Although the session ID is represented by "XXXX" in FIG. 3B, the actual session ID is formed of arbitrary string of characters created by the authentication information creation section 36.

In the href tag, a string of characters between "?" and """ is a parameter to the link. That is, the URL of the document file and the return URL in the link information 44 are the parameters to the file processing server 4. When the user clicks a link (hereinafter, referred to as document link) corresponding to the link information 44 on the browser of the mobile phone 5, the mobile phone 5 accesses the file processing server 4, and at the same time, information of the URL of the document file and information of the return URL are input to the file processing server 4.

Figure 4:
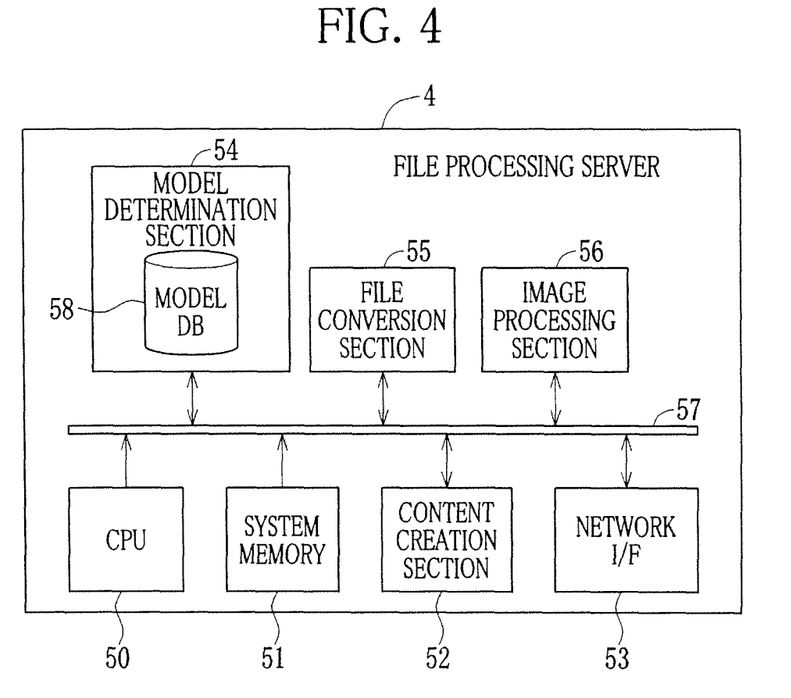
FIG. 4 is a block diagram illustrating a composition of a file processing server.

As shown in FIG. 4, the file processing server 4 includes a CPU (functions as file acquisition control section and record instruction section) 50, a system memory 51, a content creation section 52, a network I/F 53, a model determination section 54, a file conversion section 55, and an image processing section 56. Each component is connected with one another via a bus 57. The configurations of the CPU 50, the system memory 51, the content creation section 52, and the network I/F 53 are same as those of the mobile phone access server 11, and therefore the detailed explanations thereof are omitted.

The model determination section 54 is provided with a model DB 58. In the model DB 58, a model ID indicating the model of the mobile phone 5 and format information indicating data format of image data which can be displayed with this model are related with each other. When the model ID is sent from the mobile phone 5, the model determination section 54 refers to the model DB 58 based on the sent model ID, and specifies the format information of the mobile phone 5 which accessed the file processing server 4. The format information includes, for example, format such as JPEG and bitmap, resolution and image size of the LCD 16, and the like.

The file conversion section 55 converts the document file to each page of image data by virtually printing the document file obtained from the company information delivery device 3. At this time, the file conversion section 55 performs the conversion processing to the image data according to the format information specified by the model determination section 54. Owing to this, the image data corresponding to the model of the accessed mobile phone 5 can be created.

After the conversion to the image data is completed, the file conversion section 55 stores the image data in the system memory 51. If the document file has more than one page, the file processing server 4 firstly delivers the first page of the image data to the mobile phone 5. After that, the file processing server 4 reads out the image data based on the instruction from the mobile phone 5, and delivers the image data to the mobile phone 5. The image data stored in the system memory 51 is deleted after the elapse of a certain period of time, for example 24 hours, or upon response to the instruction from the user to quit browsing the image data.

When the user instructs the processing of enlargement, reduction or clipping of the image, the image processing section 56 reads out the image data from the system memory 51 and applies the instructed image processing to the image data. The image processing section 56 stores the image data before the processing and the image data after the processing in the system memory 51 again.

Figure 5:
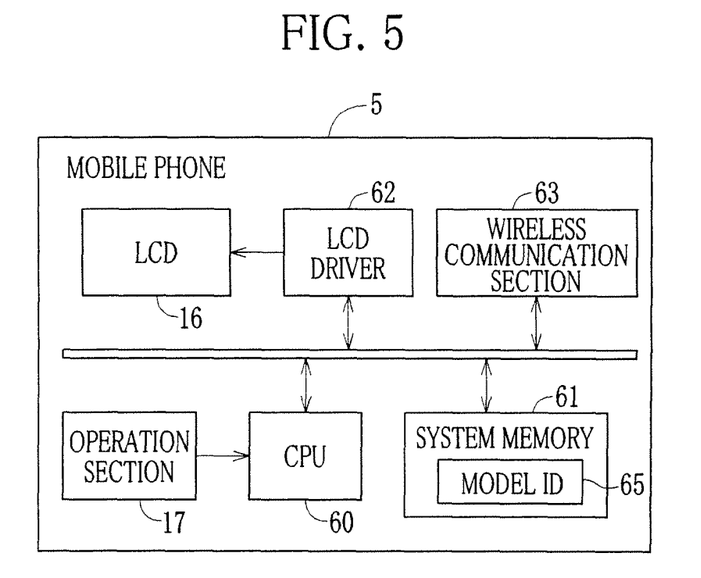
FIG. 5 is a block diagram illustrating a composition of a mobile phone.
Figure 6:
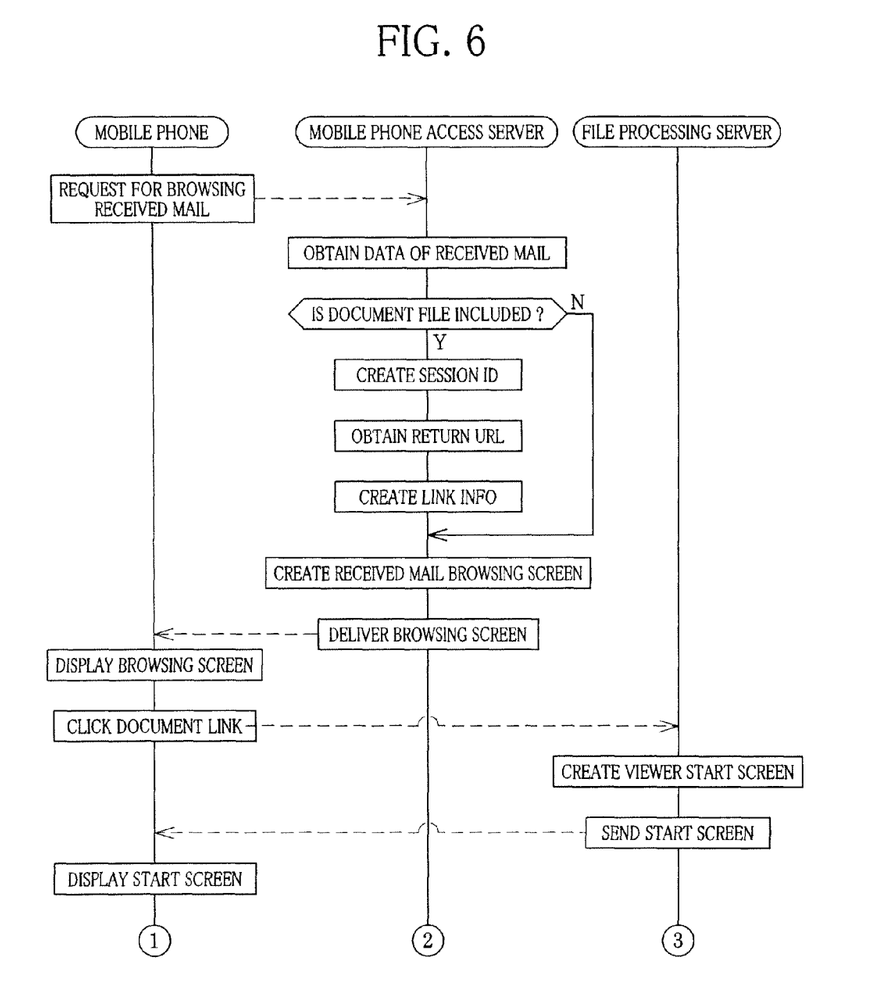
FIGS. 6 and 7 illustrate a flow chart of a process for browsing a document file.
Figure 7:
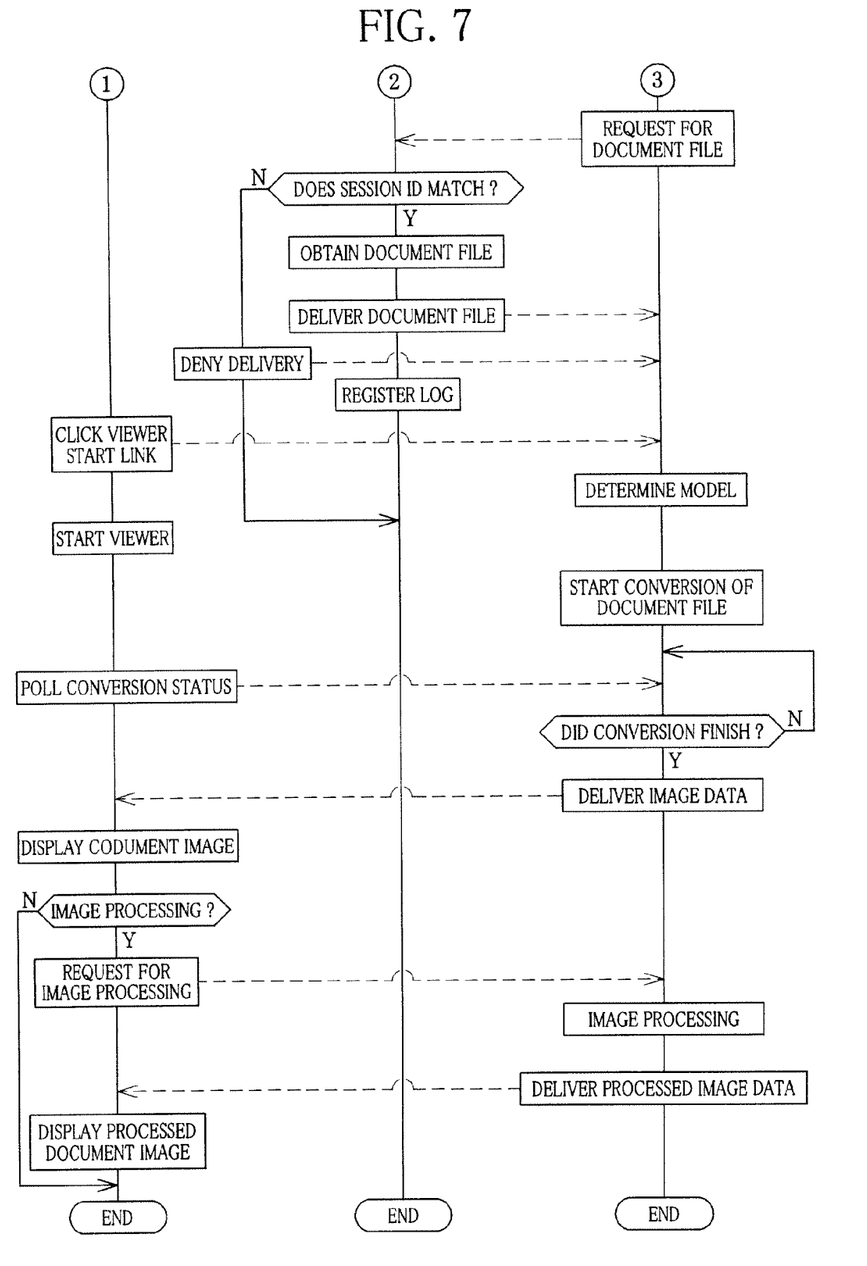

As shown in FIG. 5, the mobile phone 5 includes a CPU 60, a system memory 61, a LCD driver 62, and a wireless communication section 63 in addition to the LCD 16 and the operation section 17. Each component is connected with each other via a bus 64. The system memory 61 is provided with a ROM area and a RAM area. In the ROM area, various programs and data for controlling the mobile phone 5 are stored. The RAM area temporarily stores various data created in the process of the control. The CPU 60 reads out the various programs from the system memory 61 and takes overall control of the mobile phone 5 by processing the programs one by one.

The control section 17 is connected to the CPU 60. For this configuration, the operation instruction from the user is input to the CPU 60 through the operation section 17. A model ID 65 of this mobile phone 5 is stored in the ROM area of the system memory 61.

The LCD driver 62 reads out various image data from the system memory 61 according to a control signal from the CPU 60. The LCD driver 62 then converts the image data to an analog composite signal to output it to the LCD 16. Thus, an image is displayed on the LCD 16. The wireless communication section 63 communicates wirelessly with the base station 8, and sends or receives various data with the base station 8.

Next, an operation of the company information browsing system 2 is explained with reference to FIG. 6 to FIG. 9. To browse the received mail stored in the company information management server 10 with the mobile phone 5, the user logs in the mobile phone access server 11 and makes a list of the received mails displayed. The user selects desired received mail from the list, and sends a request to browse this mail to the mobile phone access server 11.

Upon receiving the browsing request of the received mail, the CPU 30 of the mobile phone access server 11 accesses the mail box management section 14 of the company information management server 10 and reads out the requested received mail from the mail box 15 of this user. Here, the data of the received mail is text data such as body, title, received date and time, sender and e-mail address of the received mail. When the received mail has an attachment file, text data such as file name or URL of this attachment file is also read out as data of the received mail (FIG. 8 (1)).

Figure 8:
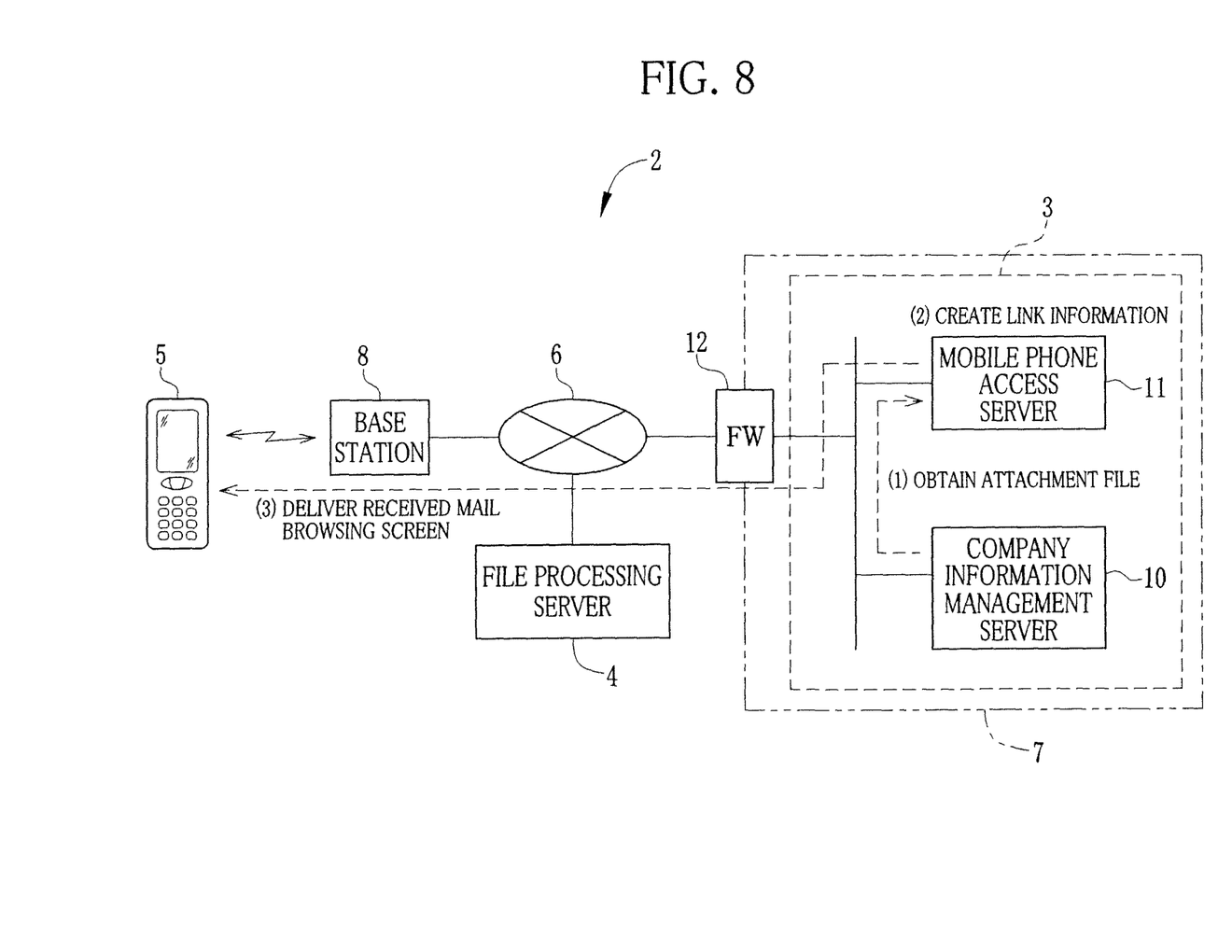
FIG. 8 is an explanatory view illustrating a flow of processing at the time of displaying a document link.

After obtaining the data of the received mail, the CPU 30 judges whether the attachment file of this received mail includes a document file according to the extension of the file name. When it is judged that the document file is included, the CPU 30 instructs the authentication information creation section 36 to create the session ID. The authentication information creation section 36 creates the session ID in response to the instruction from the CPU 30, and stores the session ID in the system memory 31 in connection with the user ID. The CPU 30 then obtains an URL of a screen which the user was browsing until just before sending the request as the return URL. In this explanation, the URL indicating the list of the received mails is obtained as the return URL.

After receiving the return URL, the CPU 30 inputs this URL to the link information creation section 37 and instructs the link information creation section 37 to create the link information 44. The link information creation section 37 reads out the URL of the file processing server 4 which is preliminary stored and the session ID from the system memory 31. The link information creation section 37 then adds the session ID to the URL of the document file obtained as the data of the received mail and to the return URL input from the CPU 30, and rewrites the link information 43 to include the URL of the file processing server 4 and the return URL, and thus creating the link information (FIG. 8 (2)).

The CPU 30 inputs the link information 44 and the data of the received mail to the content creation section 33, and instructs the content creation section 33 to create data for displaying the received mail with the mobile phone 5.

When it is judged that the document file is not included, the CPU 30 does not instruct the creation of the session ID, and just inputs the data of the received mail obtained from the company information management server 10 to the content creation section 33, and instructs to create data for display with the mobile phone 5. Hereinafter, only the case where the document file is included is explained.

When the creation of the data is instructed by the CPU 30, the content creation section 33 creates HTML data of a received mail browsing screen 70 (see FIG. 10) which displays the requested received mail on the browser of the mobile phone 5, based on the input information. The CPU 30 then delivers the created HTML data to the mobile phone 5 (FIG. 8 (3)).

Figure 10:
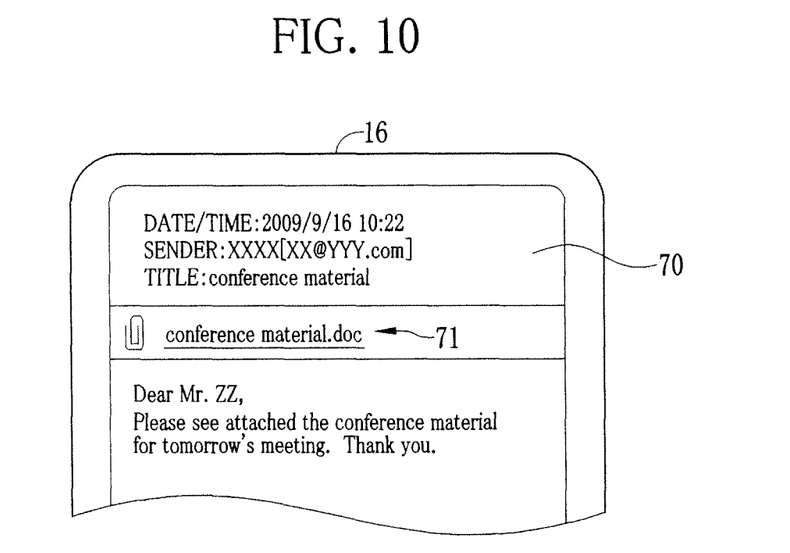
FIG. 10 is an explanatory view illustrating an example of a received mail browsing screen.

Upon receiving the HTML data delivered from the mobile phone access server 11, the CPU 60 of the mobile phone 5 stores the HTML data in the system memory 61, and also instructs the LCD driver 62 to display the HTML data. The LCD driver 62 reads out the HTML data from the system memory 61 in response to the instruction from the CPU 60, and displays the HTML data on the LCD 16. Owing to this, the received mail browsing screen 70 is displayed on the LCD 16 as shown in FIG. 10, so that the contents of the requested received mail can be browsed.

On the received mail browsing screen 70, information such as received date and time, sender and title of the mail, and the body of the mail are displayed. In addition, a document link 71 corresponding to the attachment file of this received mail is also displayed. To browse the attachment file, the user clicks the document link 71 by operating the operation section 17. When the CPU 60 detects that the document link 71 is being clicked by the input from the operation section 17, the CPU 60 accesses the file processing server 4 based on the URL of the file processing server 4 included in the link information 44 (FIG. 9 (1)).

Figure 9:
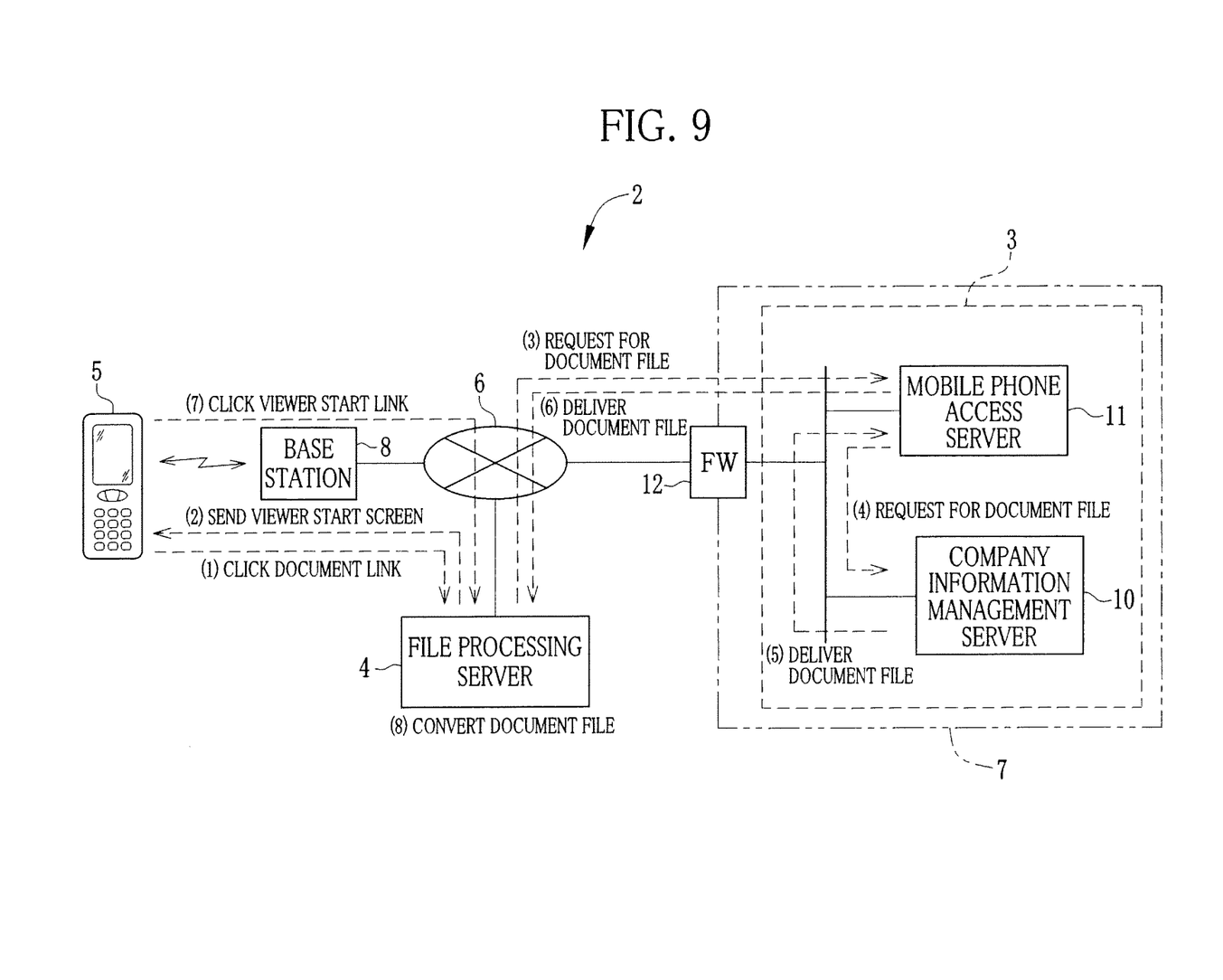
FIG. 9 is an explanatory view illustrating a flow of processing at the time of starting a viewer.

When being accessed by the mobile phone 5, the CPU 50 of the file processing server 4 firstly obtains the parameter information included in the link information 44. Specifically, the CPU 50 identifies the part following "target=" as the URL of the requested document file and the part following "returnurl=" as the return URL, and obtains these pieces of information to store in the system memory 51.

After obtaining the parameter information, the CPU 50 input the link information for starting the viewer which is preliminarily prepared in the system memory 51 and the return URL input as the parameter to the content creation section 52, and instructs the content creation section 52 to create data to start the viewer on the mobile phone 5.

When the creation of the data is instructed by the CPU 50, the content creation section 52 creates HTML data of a viewer start screen 72 (see FIG. 11) which starts the viewer, based on the input information. The CPU 50 then delivers the created HTML data to the mobile phone 5 (FIG. 9 (2)).

In addition to the delivery of the HTML data of the viewer start screen, the CPU 50 accesses the mobile phone access server 11 based on the URL of the document file input as the parameter, and requests the mobile phone access server 11 to deliver the document file (FIG. 9 (3)). At this time, the CPU 50 also instructs the mobile phone access server 11 to record log data which indicates that the user browsed the document file.

As described above, the session ID is added to the URL of the document file included in the link information 44. Upon receiving the delivery request of the document file from the file processing serer 4, the CPU 30 of the mobile phone access server 11 judges whether the session ID included in the delivery request matches the session ID stored in the system memory 31, and thereby confirming that the delivery request from the file processing server 4 is made by the proper user or not.

When it is judged that the session ID included in the delivery request and the session ID stored in the system memory 31 matches, the CPU 30 recognizes that the delivery request is from the proper user. The CPU 30 then requests the company information management server 10 to deliver the requested document file (FIG. 9(4)). In response to this request, the company information management server 10 delivers the corresponding document file to the mobile pone access server 11 (FIG. 9 (5)).

After receiving the document file from the company information management server 10, the CPU 30 of the mobile phone access server 11 delivers the document file to the file processing server 4 (FIG. 9 (6)). In response to the instruction from the file processing server 4, the CPU 30 makes the log data creation section 35 create the log data which indicates that the user browsed the document file, and stores this log data in the log DB 41 in connection with the user ID of this user.

When it is judged that the session ID included in the delivery request and the session ID stored in the system memory 31 does not mach or that the session ID is not included in the delivery request, the CPU 30 recognizes that the delivery request is not from the proper user, and sends a signal for denying delivery of the document file to the file processing server 4. When receiving the signal, the file processing server 4 makes the content creation section 52 create data of screen which displays messages for informing that the retrieval of the document file is denied and for instructing proper long into the mobile phone access server 11, and sends this data to the mobile phone 5.

When the user sends a request to browse the attachment file which is the document file, the link information 44 including the session ID is created in the mobile phone access server 11, and the mobile phone 5 is made to access the file processing server 4 based on the link information 44. At the same time, the session ID is included in the delivery request of the document file from the file processing server 4 to the mobile phone access server 11 so that the document file is delivered to the file processing server 4 only when the session ID in the delivery request and the session ID stored in the system memory 31 matches. Owing to this, it is possible to confirm that the delivery request from the file processing server 4 is made by the proper user or not even if the file processing server 4 is provided by the ASP, and thus the security in the company information browsing system 2 can be maintained. Moreover, the only thing the user has to do is to click the document link 71, which does not require input of ID or password, and therefore the operation is simple.

Moreover, if the log data is created and stored in the mobile phone access server 11 in response to the instruction from the file processing server 4, all the log data which is the operation history of the user can be managed in the mobile phone access server 11.

Figure 11:
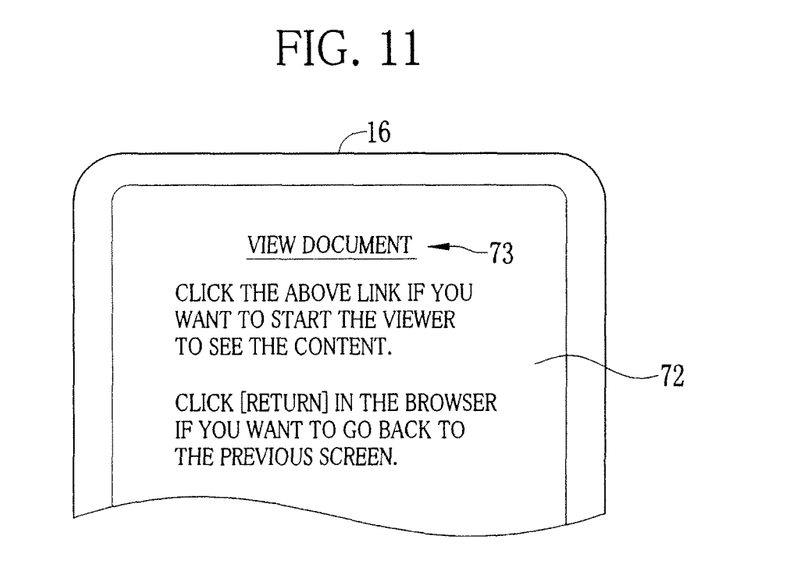
FIG. 11 is an explanatory view illustrating an example of a viewer start screen.

When receiving the HTML data for starting the viewer from the file processing server 4, the CPU 60 of the mobile phone 5 stores the HTML data in the system memory 61, and also instructs the LCD driver 62 to display the HTML data. The LCD driver 62 reads out the HTML data from the system memory 61 in response to the instruction from the CPU 60, and displays the HTML data on the LCD 16. Owing to this, the viewer start screen 72 is displayed on the LCD 16 as shown in FIG. 11.

On the viewer start screen 72, a viewer start link 73 for instructing the start of the viewer is displayed. To start the viewer, the viewer start link 73 is clicked by operating the operation section 17. When the CPU 60 detects that the viewer start link 73 is clicked by the input from the operation section 17, the CPU 60 sends a click detection signal indicating that the viewer start link 73 is clicked to the file processing server 4 (FIG. 9 (7)). At this time, the CPU 60 reads out the model ID 65 from the system memory 61, and adds the model ID 65 to the click detection signal and sends them to the file processing server 4. The CPU 60 then starts the viewer to display the image data and switches the screen display of the LCD 16.

While the viewer start screen 72 is displayed, that is, on the HTML data for starting the viewer, a "RETURN" button is corresponded to the return URL of the link information 44. To go back to the previous page, the "RETURN" button on the browser is pressed. When the CPU 60 detects that the "RETURN" button is pressed, the CPU 60 accesses the mobile phone access server 11 based on the return URL, and displays the list of the received mails which is corresponded to the return URL again. In this way, the access destination is switched back from the file processing server 4 to the mobile phone access server 11.

The return URL included in the link information 44 has the session ID. When the mobile phone 5 accesses the mobile phone access server 11 as the return URL, the CPU 30 of the mobile phone access server 11 judges whether the session ID included in the return URL matches the session ID stored in the system memory 31, like when the delivery request of the document file is sent, and thereby confirming that the user is the proper user.

Owing to this, it is confirmed that the user is the proper user or not when the mobile phone 5 accesses the mobile phone access server 11 again by pressing the "RETURN" button. Like the case where the document file is delivered, the security in the company information browsing system 2 can be maintained without causing the user any trouble.

Upon receiving the click detection signal from the mobile phone 5, the CPU 50 of the file processing server 4 sends the model ID 65 included in the click detection signal to the model determination section 54. The model determination section 54 refers to the model DB 58 based on the model ID, and specifies the format information of the mobile phone 5.

After the model determination section 54 identifies the format information, the CPU 50 instructs the file conversion section 55 to convert the document file, which is obtained from the mobile phone access server 11, to the image data.

Thus, the document file is read out while the HTML data of the start screen is delivered. Since the document file is read out while the user is clicking the viewer start link 73, waiting time of the user while reading out the document file can be decreased, and thereby improving the usability of the company information browsing system 2. In addition, since the model ID is included in the click detection signal, the model identification of the mobile phone 5 becomes easy.

In response to the instruction from the CPU 50, the file conversion section 55 starts the conversion processing to convert the document file to the image data in accordance with the format information specified by the model determination section 54 (FIG. 9 (8)). At this time, the CPU 60 of the mobile phone 5 accesses the file processing server 4 at regular intervals and performs polling of the conversion status of the document file. The CPU 60 then displays the conversion status with a progress bar on the viewer screen.

After the conversion to the image data is completed, the file conversion section 55 stores the image data in the system memory 51. The CPU 50 reads out the image data stored in the system memory 51 and delivers the image data to the mobile phone 5.

Upon receiving the image data, the CPU 60 of the mobile phone 5 stores the image data in the system memory 61, and also instructs the LCD driver 62 to display the image data. The LCD driver 62 reads out the image data from the system memory 61 in response to the instruction from the CPU 60, and displays the image data on the LCD 16. Owing to this, an image (hereinafter, referred to as document image) corresponding to the document file attached to the received mail is displayed on the LCD 16. The contents of the document file can be confirmed by browsing this document image.

After the document image is displayed, image processing such as enlargement, reduction or clipping of the image can be instructed by operating the operation section 17. When detecting the instruction of the image processing input from the operation section 17, the CPU 60 delivers the signal corresponding to the instruction to the file processing server 4.

Upon receiving the signal instructing the image processing, the CPU 50 of the file processing server 4 instructs the image processing section 56 to perform the image processing according to the signal. The image processing section 56 reads out the image data from the system memory 51 in response to the instruction from the CPU 50, and applies the instructed image processing to the image data. The image processing section 56 stores the image data before the processing and the image data after the processing in the system memory 51 again. The CPU 50 reads out the processed image data from the system memory 51 and delivers the image data to the mobile phone 5. Owing to this, the document image to which the image processing based on the user's instruction is applied can be displayed on the LCD 16 of the mobile phone 5.

In the above embodiment, the session ID is created after the attachment file of the received mail is judged to include the document file. However, the present invention is not limited to this. For example, the session ID may be created right after the user authentication is performed. In the above embodiment, the session ID is used as the authentication information, however, the authentication information is not limited to this, and may be of any information as long as it identifies that the user is authorized.

In the above embodiment, the company LAN 7 which is constructed in one business office of the company is explained as the small network. However, the network may be constructed among business offices in one company, among business offices in several companies, or among business offices apart from each other which are connected using dedicated line connection or Virtual Private Network (VPN).

In the above embodiment, the mobile phone access server 11 which is a public server is disposed inside of the FW 12. However, the present invention is not limited to this. For example, only the mobile phone access server 11 can by disposed outside of the FW 12. It is also possible to use the FW 12 having DeMilitarized Zone (DMZ) port and dispose the mobile phone access server 11 in the DMZ segment. Moreover, another fire wall in addition to the FW 12 may be provided between the company information management server 10 and the mobile phone access server 11. Owing to this, the security against the unauthorized access to the company information management server 10 can be further improved.

In the above embodiment, the mobile phone 5 is explained as an example of the mobile terminal, however, the mobile terminal may be a PHS or a PDA, or a mobile computer such as a netbook.

In the above embodiment, the company information delivery device 3 is constructed of two servers: the company information management server 10 and the mobile phone access server 11. However, the company information deliver device 3 may be constructed of a single server, or three or more servers.

In the above embodiment, although the case of browsing the received mail is explained as an example, the present invention is applicable for the case of browsing designated document file stored in the server. In the above embodiment, the electronic file converted to the image data is the document file created by the word-processing software, spreadsheet software, presentation software, and the like for personal computer terminals. However, the electronic file may be created by any other software.

Various changes and modifications are possible in the present invention and may be understood to be within the present invention.

What is claimed is:

1. An electronic file browsing system for delivering a desired electronic file to a mobile terminal to be browsed via a public network based on a request from said mobile terminal, said electronic file browsing system comprising:
an electronic file delivery device provided in a small network constructed in a predetermined area; and
a file processing device connected to said electronic file delivery device in said small network and said mobile terminal via said public network,
wherein said electronic file delivery device stores a plurality of electronic files and delivers a requested electronic file, said electronic file delivery device including:
a user authentication section configured so as to perform user authentication by judging whether a user of said mobile terminal comprises a proper user or not when delivery of said electronic file is requested from said mobile terminal;
an authentication information creation section configured so as to create authentication information indicating an authorized user when said user of said mobile terminal is judged as said proper user;
a link information creation section configured so as to create link information composed of information for accessing said file processing device, file location information indicating location of said requested electronic file, and said authentication information;

a link information delivery control section configured so as to deliver said link information to said mobile terminal which made request, wherein said file processing device includes:

a file acquisition control section configured so as to extract said file location information and said authentication information included in said link information when said mobile terminal accesses said file processing device based on said link information, and request said electronic file delivery device for delivery of said requested electronic file based on each of the extracted information to acquire said electronic file from said electronic file delivery device;

a conversion section configured so as to convert the acquired electronic file to image data; and a control section configured so as to deliver said electronic file as said image data to said mobile terminal, said electronic file browsing system further comprising:

a judgment section configured so as to acquire said authentication information from said file processing device when delivery of electronic file is requested from said file acquisition control section, and judge whether the acquired authentication information matches said authentication information created by said authentication information creation section, and thereby confirming whether said delivery request from said file acquisition control section is made from a proper user or not; and a file delivery control section configured so as to deliver said requested electronic file to said file processing device when said judgment section judges that each of said authentication information matches, while denying delivery of said requested electronic file when said judgment section judges that each of said authentication information does not match.

2. The electronic file browsing system of claim 1, wherein said link information creation section adds return information to said link information, said return information designating return destination to return to said electronic file delivery device after said mobile terminal accesses said file processing device.

3. The electronic file browsing system of claim 2, wherein said file processing device includes a model determination section to specify a model of said mobile terminal, and said conversion section converts said electronic file to said image data according to the model specified by said model determination section.

4. The electronic file browsing system of claim 3, wherein said file processing device creates screen data of a viewer start screen including a viewer start link to instruct starting of a viewer to display said image data when said mobile terminal accesses and delivers said screen data to said mobile terminal, and said file acquisition control section starts acquisition of electronic file while delivering said screen data.

5. The electronic file browsing system of claim 4, wherein said mobile terminal sends model information indicating a model of said mobile terminal in response to a click of said viewer start link, and said model determination section specifies said model of said mobile terminal based on said model information from said mobile terminal.

6. The electronic file browsing system of claim 5, wherein said electronic file delivery device includes an operation history record section to record an operation history of said user, and said file processing device includes a record instruction section to instruct said operation history record section to record said operation history.

7. The electronic file browsing system of claim 6, further comprising an unauthorized access prevention device between said small network and said public network, said unauthorized access prevention device preventing unauthorized access to said small network.

8. A control method of an electronic file browsing system including an electronic file delivery device and a file processing device, said electronic file delivery device being provided in a small network constructed in a predetermined area, said electronic file delivery device storing a plurality of electronic files and delivering said electronic file according to a request from a mobile terminal, said file processing device including a conversion section to convert an electronic file of the plurality of electronic files to image data, said file processing device being connected to said electronic file delivery device in said small network and said mobile terminal via a public network, said control method of said electronic file browsing system comprising:

performing user authentication by judging whether a user of said mobile terminal comprises a proper user or not when said mobile terminal accesses said electronic file delivery device;

creating authentication information indicating an authorized user when said user of said mobile terminal is judged as said proper user;

creating link information composed of information for accessing said file processing device, file location information indicating location of said requested electronic file, and said authentication information when delivery of said electronic file is requested from said mobile terminal to said electronic file delivery device;

delivering said link information to said mobile terminal which made request;

extracting said file location information and said authentication information included in said link information when said mobile terminal accesses said file processing device based on said link information;

acquiring said electronic file from said electronic file delivery device by requesting said electronic file delivery device to deliver said requested electronic file based on each of the extracted information;

converting the acquired electronic file to image data;

delivering said electronic file as said image data to said mobile terminal to be displayed on a display section of said mobile terminal;

acquiring said authentication information from said file processing device when delivery of electronic file is requested from said file processing device, and judging whether the acquired authentication information matches said authentication information created in said authentication information creation, and thereby confirming whether said delivery request from said file processing device is made from a proper user or not; and delivering said requested electronic file to said file processing device when it is judged that each of said authentication information matches, while denying delivery of said requested electronic file when it is judged that each of said authentication information does not match.

* * * * *